July 9, 1940.  F. H. PIERCE  2,207,411

METHOD OF PHOTOGRAPHY AND IMPROVED MEANS FOR SECURING THE SAME

Filed July 28, 1938

INVENTOR.
Frank H. Pierce
BY Mock & Blum
ATTORNEYS

Patented July 9, 1940

2,207,411

UNITED STATES PATENT OFFICE 2,207,411

METHOD OF PHOTOGRAPHY AND IMPROVED MEANS FOR SECURING THE SAME

Frank H. Pierce, New York, N. Y., assignor of thirty per cent to Samuel E. Witt, New York, N. Y.

Application July 28, 1938, Serial No. 221,679

2 Claims. (Cl. 95—5)

My invention relates to a new and improved method of photography, and to new and improved means, which can be used in association with an ordinary camera, for securing improved photography.

The invention relates to mono-color photography and it also relates to color photography.

One of the objects of the invention is to produce greater depth of picture, so as to sharply focus objects in the foreground and also objects in the background.

Another object of the invention is to secure the improved results by very simple means which can be readily attached to an ordinary camera.

Another object of the invention is to eliminate the necessary of reducing the effective aperture of a camera lens at any time.

Another object of the invention is to control the effect of the illumination upon the sensitized surface by merely regulating the speed of the shutter.

Another object of the invention is to secure sharper pictures in less time than would otherwise be possible.

Another object of the invention is to reduce to a minimum the necessity for focussing sharply where a wide aperture is involved.

Another object of the invention is to reduce to a minimum the necessity for retouching in portraiture and landscape photography.

Another object of the invention is to provide a means of penetrating haze in action pictures where the action is at close range, while at the same time emphasizing any clouds or other infinitely remote objects that may constitute a fitting setting for the said action.

Another object of the invention is to combine all of the advantages of a filtered aperture of undiminished size with all of the advantages of a clear aperture of a substantially reduced size, without involving any of the disadvantages of either of these well known expedients.

Another object of the invention is to provide the characters or subjects of the scene with certain distinctive surface coloring, in order to secure increased depth of focussing.

Another object of the invention is to adapt a simple lens to the resolution of a beam of ordinary daylight without stopping down the aperture.

The invention is also adapted to employment as a means of improving upon such direct-vision devices as spectacles, sun glasses, snow glasses and goggles.

Other objects of the invention will be stated in the following description and drawing which illustrate preferred embodiments thereof.

It has been well-known for many years that it is very difficult to secure proper depth in photography. When the camera was focussed upon the desired object, other objects in the background were photographed with very poor definition. Likewise the range of a lens was severely limited by its focal length. Likewise in many cases, it was necessary to regulate the effective aperture of the lens by means of the well-known iris diaphragm or the like.

With the use of the improved type of filter disclosed herein, it is possible to secure great depth with sharp definition, to greatly exceed the limits of a lens of given focal length, and also to regulate the exposure merely by controlling the speed of the shutter and without operating the usual diaphragm. The invention is applicable not only to still photography, but also to motion picture photography.

Figure 1:
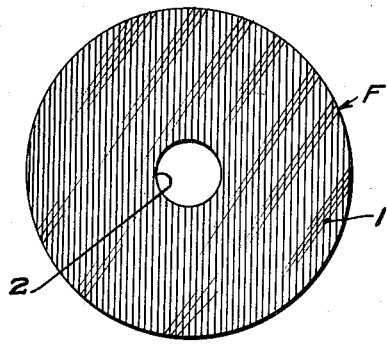
Fig. 1 is an elevation of a filter which can be used in ordinary black-and-white photography.

Referring to the filter shown in Fig. 1, this can be made of glass or gelatine or other suitable transparent material. This filter has a main body thereof provided with a given color, such as red, green, or violet, in the main area 1 thereof. Said filter F has a central aperture 2 and the area of the said aperture is very much less than the area of the main colored body of the filter.

As a practical example, and without limiting myself to any specific figures, if the diameter of the filter is 1¼ inches, for a lens having the same diameter, said lens having a focal length of 2 inches to 8 inches, the diameter of the aperture 2 would be approximately 20% of the said diameter or ¼ of an inch. However, the diameter of the central opening 2 may be even smaller, as for example, ⅛ of an inch, and in very special cases it may be infinitely small; or it may be much greater, as for example, ¾ of an inch, and I do not wish to limit myself to any particular size of aperture, save that the purpose of the aperture 2 shall be substantially that of a reduced aperture.

Preferably the main body of the filter has one of the primary colors (red, green or violet), or one of the secondary colors (yellow, blue or crimson). However, the main body of the filter may have a tertiary color (orange, blue-green or scarlet), or any other color, such as vermilion, yellow-green, blue-green, blue-violet, purple or magenta.

The main body of the filter is preferably free from any transparent colorless portions, so as to prevent white light from passing through the main body of the filter.

The color should be uniform throughout the main body 1 of the filter, so as to exclude all rays save the rays having the color of the said body, although a small percentage of white light may be permitted to issue uniformly through the said main body. However, the purpose of the said main body shall be substantially that of a color filter.

Generally speaking, the color of the body 1 of the filter should correspond to the basic color of the object which is most sharply in focus and the other objects should preferably have a color different from the basic color of the object in the foreground, so that the body of the filter blocks the rays from said other objects.

For general utility work, the body 1 of the filter may either have a red color or an orange-yellow color. Filters having these colors can be used in photographing nearly all scenes, although the color of the body 1 of the filter can be changed by an expert photographer to meet special conditions.

Assuming, for example, that it is desired to take a photograph of a human being, against a background of green, the camera is focussed upon the human being. In such cases the predominant flesh tone of the face of the human being is a reddish tint. Under such circumstances I use a red filter so that only red light can pass through the main body of the filter and all other colors are blocked by the main body of the filter.

However, all the light can pass through the central aperture of the filter, so that the green background is photographed upon the sensitive plate or film only through the small central aperture.

The central point of this aperture is preferably on the optical axis of the camera. This central aperture acts like a reduced aperture, whose effect is augmented by the surrounding colored annulus, so that the subject which has the green light is photographed to great depth.

Likewise the use of the perforated filter makes it unnecessary to focus very sharply upon the object in the foreground.

If it is desired to photograph a group of people, some in the foreground and some in the background, either for still photography or in motion picture photography, the people in the background could have green makeup and green colored clothing, and the people in the foreground could wear red clothing and have a reddish makeup. The use of the perforated red filter under such circumstances will give great depth and very sharp definition.

The color of the filter therefore depends upon the general color scheme of the foreground and of the background. For example, if the foreground is of green color and it is desired to emphasize the foreground, and the background is of a red color, the perforated filter would then have its main body 1 of a green color.

If indulged in too freely, the customary expedient of stopping down in order to secure depth of focus will give rise to an unnatural uniformity of definition for the entire depth of the field. Thus, where a given main subject is even a few yards distant from the camera, the depth of the average out-of-doors field is so great in comparison that it is impossible to secure sharpness of definition for the entire depth of the field by stopping down, except at the expense of defining the main subject in terms of a universal focus instead of its being more accurately in focus and therefore more vividly rendered than any other subject in the entire field.

Moreover, where the employment of a wide aperture is involved, it is generally impossible to arrive at a satisfactory comprise between a vivid rendering of a main subject a few yards distant and a hopeless diffusion of the definition for some relatively remote plane, by focussing for some intermediate plane. The penalty for so doing may even involve an emphasis of the sharpness of definition for some unimportant object lying in an intermediate plane.

Where depth of field is involved, critical vision is not confined to a definite plane, and the attention is engaged mainly by limited centers of interest having one form or another of attention-arresting value. That is where photography fails, in an artistic sense.

Artistic imagery is possible. A beam of light may be integrated, instantaneously, in terms of a chromatic interplay between whatever opposing tendencies may be involved in its resolution by a given resolving medium of any kind. Thus, an emphasis of attention-arresting value may be secured in terms of an illusion of depth. That is the basis of my new method of photography.

This new method will yield a chromatically integrated photograph, a composite image. One of the component projections, a paraxial bundle of circular form and limited size, may issue through a relatively reduced central aperture, 2, while another, a surrounding sheath of annular form, may traverse a surrounding filtering annular aperture, (for a given color). Their superimposition, in an image plane that is conjugate to a given field plane, will give rise to a composite image, a chromatically integrated image.

Where this method is employed, all the detail in all field planes may be faithfully defined, by virtue of a reduced aperture, 2, while the definition of a given kind of contrast in the plane that is in focus may be strongly emphasized through a surrounding filtering aperture 1.

Where used wisely, this new technique will secure finer effects than are otherwise possible in an endless array of artistic conceptions. With a given type of subject and setting, the selection of an appropriate form of perforated filter for securing a given effect is a matter of ordinary judgment.

Portraiture in full color is not now feasible, except in miniature, because ordinary filter factors are too high; even 16-mm. imagery in full color cannot now be endowed with genuine artistic merit, because wide apertures are necessary for high filter factors. Certainly, the pronounced annular tendencies of resolution that are thus encountered will predominate enormously. Thus, there can be no illusion of depth, and the flaring diffusion of bright objects and sources that are not in focus may fog or even swamp the definition of details that are in focus, or at least interfere.

In order to make the situation a little more vivid, let us take a special case. We assume we have a Leica lens of focal length 50 mm. used at, say, f 5. If the lens is focussed on infinity, so as to get a landscape picture, and the resultant picture is viewed at a distance of 25 cm. from the eye, everything will be in focus that lies between infinity and 6.7 meters, a very nice depth of focus. If the lens is focussed for 5 meters distance, everything will be sharp between 20 meters and 3 meters, again quite satisfactory, and the distant background will be only slightly blurred. If now the photograph is enlarged ten times (a not unusual figure), a picture of distant objects will be sharp only down to 70 meters, and the foreground will be poorly defined. Similarly, the picture focussed for 5 meters will be sharp only between 4.65 meters and 5.4 meters, the remainder being blurred. In order to secure a reasonable depth of focus for these enlargements the lens should be stopped down to ⅓ or ⅕ of its original value.

Figure 2:
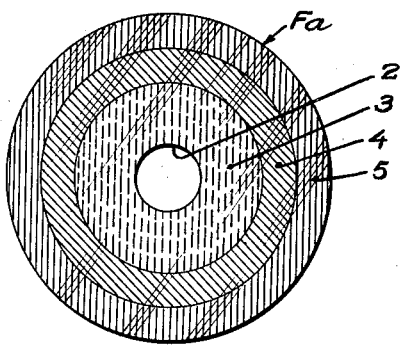
Fig. 2 is an elevation of a filter which can be used in color photography.

For use in color photography, I prefer the filter Fa shown in Fig. 2. This has an outer transparent annulus 5 of red, an intermediate transparent annulus 4 of green, and an inner transparent annulus 3 of violet, and the same central aperture 2 as in the filter previously described. If desired, the areas of said annuli may be either equal or unequal.

These filters can be made of colored gelatine, mounted on a rigid transparent base. For some purposes the aperture 2 may be eliminated so that the central part of the filter Fa consists of an imperforate circular disc of uniform violet color.

Here a greatly reduced aperture, 3, is provided for the violet primary, while a surrounding reduced aperture, 4, of annular form and intermediate size, is afforded for the green, and another surrounding aperture, 5, of maximum size, is reserved for the red. This arrangement will insure an invaluable depth of focus for the blue end of the spectrum, including ultraviolet, while at the same time emphasizing the definition of the red end of the spectrum, including flesh tints, in the plane that is in focus. It will also yield a moderate depth of focus for the green portion of the spectrum, especially blue-green.

Most subjects require the foregoing described arrangement, but a transposition of the primaries will yield a corresponding conversion of the chromatic interplay between the dissimilar tendencies of resolution. Numerous variations, including partial transpositions, are possible. Each will impart a given chromatic interplay between whatever opposing tendencies may result from a given resolving medium. Owing to the degree of control that may be thus exercised over the definition of bright objects that are not in focus, a high f-ratio will not be required.

Sharp definition of all objects in all planes, combined with an emphasis of attention-arresting value in the plane that is in focus, will make it possible to secure better effects in full color with less expensive lenses than are now required for inferior imagery.

A tricolor filter of the form shown in Fig. 2, having a central aperture for all colors of light, will give rise to pastel effects in full color, with a greater depth of focus for all colors than would result from the employment of a tricolor filter having no central clear space.

A further step in the same direction is also possible: A bicolor filter having a central clear space 2, surrounded by a graduated annulus involving only two colors, is required. This form is not shown in the accompanying drawing, except that Fig. 2 may be made to serve as an illustration thereof by eliminating the outer annulus 5, and including only the aperture 2 and the annuli 3 and 4 to indicate a pair of complementary colors, such as red and blue-green, for example. Where only two colors are isolated the central clear space 2 may be larger. Thus it will be possible to secure lighter pastel effects, in full-color motifs, with a less expensive lens.

The foregoing described methods will secure an endless variety of artistic effects, in full color or in pastel versions thereof. The said methods apply to any kind of full-color photography and to black-and-white imagery.

Where a simple lens has been spherically corrected for light of a given color, it is possible to secure unusually artistic effects in black and white. The same rules apply, except that the isolation of only one color is implied, presumably the color for which the lens has been spherically corrected.

Where a simple lens has been insufficiently corrected for light of a given color, and the intermediate zones are a hindrance to definition, the form shown in Fig. 2 (altered to suit) may be required. For example, the annulus 3 may be opaque. Thus, in two-color imagery in full color, the component 3 (Fig. 2) may be blue-green, which is complementary to the red in the outer annulus, 5.

The employment of an opaque annulus will also serve another important purpose: Chromatic integration requires a definite dissimilarity between opposing tendencies of resolution. The greater the difference between them, the more pronounced will be the artistic effect that will result from their being superimposed in a composite image.

Whether a reduced aperture applies to all colors, or only to a limited portion of the spectrum, its main function will be plainly that of securing an illusion of depth. It should not exceep a maximum size, for that reason. Nor should it be of such diameter as to steal the show.

Where it is possible to indulge in long exposures involving seconds, or minutes, or hours, instead of split-seconds, wide opaque interspacing between very narrow annular apertures will secure effects, in full color, pastel shades, or black-and-white. Hand painting of the very best possible kind that could be produced would be relatively coarse.

Point-for-point definition, through the axial zones of a lens, will give rise to an illusion of depth. Superimposed thereon, the emphasis of a given color in a given plane, or the emphasis of a given chromatic series therein, and the diffusion of all similarly colored objects in all other planes, is possible. The chromatic integration of the light issuing through a very narrow marginal aperture of annular form, or that issuing through a chromatic series of appropriately insulated apertures of annular form, is implied.

In full-color reproduction an opaque annulus may be employed to reduce the volume of a given pair of colors without reducing that of a third color.

In motion picture photography, and in still photography, the filter may be located in any convenient place, either in front of the camera lens or lenses, or behind the same, or even between the camera lenses. The diameter of the filter is equal to the diameter of the lens of the camera so that the entire surface of the lens of the camera is covered by the filter, save for the central aperture, if the filter has such aperture.

Instead of using a filter, it would be an equivalent to provide a camera with a plurality of lenses in its optical system, one of said lenses having the color of the body of the filter, said colored lens having a very thin or colorless central part which corresponds to the aperture of the filter F. In a camera which has an optical system consisting of two lenses, one of these lenses is usually positive and the other lens is negative.

I prefer to provide a colored negative lens to produce the results previously mentioned.

In other words, whenever I have referred to a filter herein, I have referred to and I include any part of the optical part of the camera.

Under certain conditions in microphotography, different parts of the object which are substantially in the same plane may be of different colors. For example, the surface which is being photographed may be irregular, consisting of projections and depressions. The projections may be red and the depressions may be blue. Under such conditions a filter of the kind shown in Fig. 1, having a red body may be utilized in order to bring out the details of the projections and to secure sharper photography than if the body of the filter had a blue color, by focussing on the projections. The small central aperture allows enough light from the depressions to pass to the light-sensitive plate or film in order to record them.

Generally speaking, the color of the body of the filter should correspond to the color of that part of the object which it is desired to emphasize in terms of white. In this connection it is important to observe that where an ordinary filter of sharp cut is employed no distinction is made between white and whatever color is emphasized, nor between black and whatever color is suppressed, and it is much more scientific to provide a central clear space 2 than to employ a filter of unsharp cut where a modified contrast is desired, in any kind of photography whatsoever, and it is much easier to control the relative size of the former than to alter the color density of the latter, especially where an iris diaphragm is employed.

Colored spectacles, sunglasses, and the like, are not prescribed for the purpose of preventing the wearer from seeing things in their natural colors, but rather to protect the eyes from glare or intensities of light that interfere with vision. But in many cases they are either a mere gesture in the direction of protection, or if they are efficient in that respect, they prevent the wearer from seeing distinctly where ordinary intensities are involved.

In order that a pair of colored spectacles may be of such density as to be impervious to that portion of the light which may be deemed objectionable, it stands to reason that unless a means is provided for the optional transmission of that portion of the light which is not a hindrance to vision, an equal amount of each will be absorbed indiscriminately.

Critical vision, as distinguished from vision in general, is confined to a comparatively limited portion of the retina, namely, the fovea centralis. Thus, through the agency of a central clear space surrounded by an appropriately colored annulus, anybody with normal vision may be readily enabled to obtain a better view of a given object through the said central clear space 2 than through ordinary colored spectacles, while at the same time being especially shielded from glare. Moreover, where a given center of interest may itself be too intense for critical vision, as, for example, the glare of automobile headlights, a central space surrounded by a colored annulus, or a series of differently colored annuli, will answer the purpose. Incidentally, the color, or pattern, may be made to harmonize with the color of one's apparel, or one's own facial coloring, or a given setting or occasion.

I claim:

1. In color photography, that step in the art which consists in permitting light of substantially all colors to enter the aperture of the camera directly at the axis of its optical system, permitting only violet light to enter the aperture of the camera directly around the axis of the optical system of the camera, allowing only green light to pass through said aperture adjacent the violet light, and allowing only red light to pass through said aperture at the boundary line of said aperture.

2. A method of photographing a scene having a foreground and a background of different colors, which consists in focussing on a predetermined object in the foreground, permitting light rays of all colors to pass through the aperture of the camera in an area around the axis of its optical system, and allowing only light whose color corresponds substantially to the sharply focussed object in the foreground to pass through the remainder of the aperture of the camera in an area which is greater than the first mentioned area.

FRANK H. PIERCE.